US009012021B2

(12) United States Patent
Swift et al.

(10) Patent No.: US 9,012,021 B2
(45) Date of Patent: Apr. 21, 2015

(54) COMPOSITION OF MATTER FOR COMPOSITE PLASTIC CONTACT ELEMENTS FEATURING CONTROLLED CONDUCTION PATHWAYS, AND RELATED MANUFACTURING PROCESSES

(75) Inventors: Joseph A. Swift, Ontario, NY (US); Stanley J. Wallace, Victor, NY (US); Roger L. Bullock, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1121 days.

(21) Appl. No.: 12/055,616

(22) Filed: Mar. 26, 2008

(65) Prior Publication Data
US 2009/0246521 A1    Oct. 1, 2009

(51) Int. Cl.
*D02G 3/00*    (2006.01)
*H01B 1/12*    (2006.01)
*B29C 70/02*   (2006.01)
*B29C 70/08*   (2006.01)
(Continued)

(52) U.S. Cl.
CPC .............. *H01B 1/127* (2013.01); *B29C 70/025* (2013.01); *B29C 70/081* (2013.01); *B29C 70/882* (2013.01); *B82Y 30/00* (2013.01); *C08G 2261/3221* (2013.01); *C08G 2261/94* (2013.01); *C08J 5/005* (2013.01); *C08J 5/042* (2013.01); *C08J 2300/12* (2013.01); *C08L 63/00* (2013.01); *C08L 65/00* (2013.01); *C08L 79/02* (2013.01); *D01F 9/127* (2013.01); *D06M 11/74* (2013.01); *D06M 11/83* (2013.01); *D06M 23/16* (2013.01); *H01B 1/04* (2013.01); *H01B 1/24* (2013.01)

(58) Field of Classification Search
None
See application file for complete search history.

(56) References Cited

U.S. PATENT DOCUMENTS 5,139,862 A * 8/1992 Swift et al. ............... 428/299.1
5,354,607 A * 10/1994 Swift et al. ................. 310/251
(Continued)

FOREIGN PATENT DOCUMENTS

EP    369772 A2 *  5/1990    ............. H01H 1/02
EP    453143 A2 * 10/1991    ............. G03G 15/00
(Continued)

OTHER PUBLICATIONS

Levin, Michael, "Particle Characterization: Tools & Methods"; Laboratory Equipment, (2005).*
(Continued)

*Primary Examiner* — Jill Gray
(74) *Attorney, Agent, or Firm* — MH2 Technology Law Group LLP (57) ABSTRACT

Exemplary embodiments provide composite materials, methods for making and processing these materials, and systems for using the composite materials. The disclosed composite material (or composite member) can include fiber-like and/or particulate materials incorporated within a binder polymer. For example, the composite member can include fibril-shaped, semi-conductive elements that are contained in a suitable binder polymer to achieve a particular resistance value, wherein the fibrils can be integrated and interlinked in a manner as to create an array of resistive elements that precisely define and control current flows through the related device. The composite member can therefore have resistive characteristics and, none or neglectably low amount of capacitive or inductive characteristics. The composite member can be used in electric test market, e.g., as high performance, dynamic probes/sensors for very frequency and/or complex mixed-frequency signals.

18 Claims, 5 Drawing Sheets

(51) Int. Cl.
*B29C 70/88* (2006.01)
*B82Y 30/00* (2011.01)
*C08J 5/00* (2006.01)
*C08J 5/04* (2006.01)
*D01F 9/127* (2006.01)
*D06M 11/74* (2006.01)
*D06M 11/83* (2006.01)
*D06M 23/16* (2006.01)
*H01B 1/04* (2006.01)
*H01B 1/24* (2006.01)
*C08L 63/00* (2006.01)
*C08L 65/00* (2006.01)
*C08L 79/02* (2006.01)

(56) References Cited

U.S. PATENT DOCUMENTS

| | | | |
|---|---|---|---|
| 5,599,615 A * | 2/1997 | Swift et al. | 428/293.1 |
| 6,197,219 B1 * | 3/2001 | Foulger | 252/500 |
| 6,455,143 B1 * | 9/2002 | Ishibashi et al. | 428/294.1 |
| 6,828,374 B2 * | 12/2004 | Ishibashi et al. | 524/495 |
| 6,835,436 B1 * | 12/2004 | Reif et al. | 428/119 |
| 7,052,763 B2 * | 5/2006 | Swift et al. | 428/300.4 |
| 7,321,234 B2 | 1/2008 | Campbell et al. | |
| 7,338,684 B1 * | 3/2008 | Curliss et al. | 427/180 |
| 7,927,701 B2 * | 4/2011 | Curliss et al. | 428/408 |
| 7,935,415 B1 * | 5/2011 | Hansen et al. | 428/292.1 |
| 7,947,773 B2 * | 5/2011 | Hansen et al. | 524/434 |
| 8,018,059 B2 * | 9/2011 | Swift et al. | 257/758 |
| 8,025,960 B2 * | 9/2011 | Dubrow et al. | 428/304.4 |
| 8,435,676 B2 * | 5/2013 | Zhamu et al. | 429/231.8 |
| 2006/0228140 A1 | 10/2006 | Swift et al. | 399/411 |
| 2007/0190880 A1 * | 8/2007 | Dubrow et al. | 442/181 |
| 2008/0020193 A1 * | 1/2008 | Jang et al. | 428/292.1 |
| 2008/0111110 A1 * | 5/2008 | Ma et al. | 252/500 |
| 2008/0213560 A1 * | 9/2008 | Moireau et al. | 428/222 |
| 2009/0239056 A1 * | 9/2009 | Moireau et al. | 428/296.4 |
| 2009/0246521 A1 * | 10/2009 | Swift et al. | 428/401 |

FOREIGN PATENT DOCUMENTS

| | | | |
|---|---|---|---|
| EP | 0883211 | 12/1998 | |
| EP | 2112192 A2 * | 10/2009 | H01B 1/12 |
| JP | 07011466 | 1/1995 | |
| WO | 2006069140 | 6/2006 | |
| WO | 2007130979 | 11/2007 | |
| WO | 2008130979 | 11/2007 | |

OTHER PUBLICATIONS

Partial European Search Report, European Patent Application No. 091400157.8, European Patent Office, Aug. 3, 2009, 3 Pages.
European Patent Office, European Search Report, European Patent Application No. 09100157.8-2102, Oct. 7, 2009, 4 Pages.

* cited by examiner

COMPOSITION OF MATTER FOR COMPOSITE PLASTIC CONTACT ELEMENTS FEATURING CONTROLLED CONDUCTION PATHWAYS, AND RELATED MANUFACTURING PROCESSES

DESCRIPTION OF THE INVENTION

1. Field of the Invention

This invention relates generally to non-metallic electric contacts and to high performance, composite plastic contacts and related elements and, more particularly, to sensors and instrument probe elements featuring controlled conduction pathways.

2. Background of the Invention

Recently, there has been considerable interest in using electrically conductive composite plastics for various device applications in the electronics industry with rapidly emerging, high performance and high value contacts, interconnects, sensors, probes, and the like for use in a wide spectrum of electric test, measure, and control applications. In these composite plastic-based devices, resistive elements are often used within binder polymers to form a functional apparatus that includes a specific size and shape coupled with a unique combination of mechanical and electrical characteristics.

Electric contact can be described as a junction between two electrical conductors through which an electrical current or signal can pass. Sensors can be described as a device that responds to physical, electrical, or electronic stimulus and transmits a resulting signal or impulse as for measurement or control. Problems arise, however, due to the electrical insulating characteristic of the typical binder polymers that are used to secure the conductive or resistive elements of a composite plastic and to secure electric contact into an integrated solid. The binder polymer (e.g., resin) typically fills the space between and surrounding the resistive elements. Thus, the insulating resin can serve as a thin insulating layer separating current-conducing fibers and presumably can thereby act as a capacitive circuit element during operation of the device. The result can be a decrease in the frequency response of the composite plastic-based device and/or a modification of the waveform eminating form the device. For example, signal transmission through uni-directional-conductive fiber-filled plastics used for contacts or sensors in a high frequency AC circuit is problematic. Importantly, the problems can be related to a variety of root causes, which include, for example, large variations in the microscopic composition; lack of precisely defined current pathways; non-uniform fields within the operating device; and as mentioned above the presence of unwanted capacitive and inductive (leakage and parasitic) effects. Each of these may relate to the type, amount, and position of binder resin and/or to the process by which the resin and filler are processed, which in turn can adversely influence the bulk and microscopic electrical properties of the contact as well as its mechanical properties and some or all of the frequency responses or outputs of the subject device. Non-linear electrical responses that have more disturbances or perturbations in some regions of the radio frequency spectrum and less disturbances in others can therefore be generated and observed in many conductive composite plastic elements. Furthermore, large variation in the output signals transmitted by or through composite plastics and particularly amongst contacts made in commercial-scale production lots can result.

Thus, there is a need to overcome these and other problems of the prior art and to provide composite members featuring controlled conduction pathways to overcome non-linear responses in frequency space and to provide a high degree of part-to-part precision of the composite plastic members used in electrical contacts, interconnects, sensors and probes of electric test equipment, measurement apparatus, instruments, and the like.

SUMMARY OF THE INVENTION

According to various embodiments, the present teachings include a composite member. The composite member can include a binder polymer and a plurality of continuous filaments disposed within the binder polymer to provide a primary electric conduction length. In addition, the plurality of continuous filaments can be interlinked in a manner to create a secondary electric conduction path that controls a current level that is translated through the composite member.

According to various embodiments, the present teachings also include a method for forming a composite probe by shaping a composite member into one or more probe tips. The composite member can be formed by disposing a plurality of continuous filaments within a binder polymer for providing a primary electric conduction length. The plurality of continuous filaments of the composite member can further be interconnected in a manner to create a secondary electric conduction path for the one or more probe tips.

According to various embodiments, the present teachings further include a method for forming a composite probe by shaping a composite member into one or more probe tips. The composite member can be formed by disposing a plurality of continuous filaments and one or more conductive fillers within a binder polymer. The plurality of continuous filaments can be interlinked by the one or more conductive fillers in the one or more probe tips.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments (exemplary embodiments) of the invention, an example of which is illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume values as defined earlier plus negative values, e.g. −1, −1.2, −1.89, −2, −2.5, −3, −10, −20, −30, etc.

Exemplary embodiments provide composite materials, methods for making and processing these materials, and systems for using the composite materials. The disclosed composite material (also referred to herein as composite plastic or composite member) can include fiber-like and/or particulate materials incorporated within a binder polymer. For example, the composite member can include fibril-shaped, semi-conductive elements that are contained in a suitable binder polymer to achieve a particular bulk, surface, or end-to-end resistance value, wherein the fibrils can be integrated and interlinked in a manner as to create an array of resistive elements that precisely define and control current flows through the related device. The composite member can therefore have resistive characteristics and, none or neglectably low amounts of capacitive or inductive characteristics. The composite member can be used in electric test, sense, and/or control market, e.g., as high performance, dynamic probes/sensors for mid- to very-high frequency AC or RF signals and/or complex mixed-frequency signals.

As used herein and unless otherwise specified, the term "composite member" or "composite material" refers to a component or element that includes one or more continuous filaments disposed within a binder polymer to provide a resistance value for a primary electric conduction length along a specific (usually elongated) direction. In addition, the continuous filaments can be interlinked or interconnected in a manner as to create at least one secondary electric conduction path that precisely defines and controls the level of current or charge translated through the composite member into, e.g., the probe contact.

The "composite member" can take a form including, but not limited to, a rod, shaft, sheet, pillar, pipe, tube, hollow body or other semi-finished product or finished product from various composite shaping technologies. In an exemplary embodiment, the "composite member" can be a composite rod having a diameter of, for example, about 0.01 mm to about 100 mm or for example, 0.0004 inches to about 4 inches. In an additional example, the composite rod can have a diameter ranging from about 0.010 inches (0.25 mm) to about 0.025 inches (0.63 mm). When the composite rod is configured for a high-performance contact sensor or probe, a short length of about 0.05 to about 0.5 inches can be used. For example, a high performance probe can be made from a composite rod having a short length of about 0.070 inches having a length tolerance of ±0.001 inches or less.

As used herein and unless otherwise specified, the term "continuous filaments" (also referred to herein as "continuous fibers") refers to filaments/fibers/fiber-tows running continuously along a major axis, which may be the length-wise axis (i.e., in the elongated direction) of the composite member in order to provide a primary electric conduction path. The continuous filaments are typically commercially manufactured and sold in units referred to as "tows". Individual fibers within the tow can be assembled within the composite member to be separated from each other by and within the binder polymer or can be bundled tightly together within the binder polymer. In various embodiments, arrays of continuous filaments or filaments bundles can be included within the binder polymer and characterized by physical, mechanical, electrical, optical, and/or other properties that have a macro-scale or macro-dimension to represent the features of interest of the subject composition. Alternately, these properties can be examined and represented on the micro-scale. For example, the relative mass or loading of fiber distributed within the resin can be viewed to be a macro-scale property, while the distribution of fibers within a sample cross-section of the composite can be considered as a micro-scale property. This macro- and micro-distinction is generally not an arbitrary one and is important because the embodiments described herein can employ modifications to the micro-scale composition to affect output characteristics that can be measured on the macro-scale of the entire component.

The continuous fibers/filaments can be designated by the type, size, shape, and number of fibers they contain. For example, a composite member can include a fiber number of, e.g., about 10 to 100,000 or higher. In an exemplary embodiment, the continuous fibers/filaments can be about 100 to about 10,000 fibers in number in the composite member. In various embodiments, each fiber/filament can include or be doped with, for example, silicon, doped silicon, carbon, boron-carbon, boron-nitride, metal oxides, doped metal oxides, or other suitable elements. For example, the continuous fibers/filaments can include carbonized synthetic fibers, such as carbonized polyphenylene oxide (PPO) fibers or polyacrylonitrile (PAN) carbon fibers, pitch carbon fibers, partially carbonized PAN fibers, and similar others including graphite. In addition, each fiber/filament can take an exemplary form including, but not limited to, a whisker, wire, needle, nail, thread, yarn, fabric, or combinations thereof. In various embodiments, the fiber/filament can have at least one minor dimension in the nano-scale that, for example, a width or diameter of about 100 nanometers or less. Furthermore, each continuous fiber/filament within the binder polymer can possess a particular resistance depending on, e.g., the materials used for the fiber/filament. In practice, the resistance per length (R/L) of an individual fiber or a fiber tow is often predetermined by the raw materials' selected and process performed by the fiber manufacturer. Alternately, a coating such as a thin metal layer coating, on the fiber can be used to modify the electrical or other properties of the fiber. In addition, fibers having less than a continuous length of the composite member, for example, a "spun broken" or "staple-length" fiber, can be used. In an exemplary embodiment, each fiber can have a resistance in the range of about 0.01 to about 1000 megaohms/cm.

The continuous filaments/fibers can be formed within a binder polymer using various compositing and shaping technologies including, but not limited to, pultrusion, compression molding, transfer modeling, filament-winding, prepreg-forming, fiber placing operation, injection molding, insert molding, extrusion, injection blowing, solution casting, or other forming and/or shaping technologies. For example, in a pultrusion process, continuous fibers/filaments/fiber-tows can be directed to enter a resin liquid phase for impregnation with a suitable matrix resin for mass production of composite materials. In various embodiments, the disclosed composite member with constant cross-section can be formed by pulling the reinforcing fibers through a resin, followed by a separate preforming system, and into a heated die where the resin undergoes polymerization. The resin used herein can be conductive or insulating according to various embodiments.

Figure 1A:
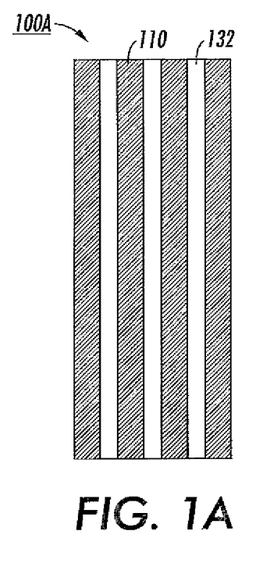
FIGS. 1A-1C depict a portion of exemplary composite members in accordance with the present teachings.
Figure 1B:
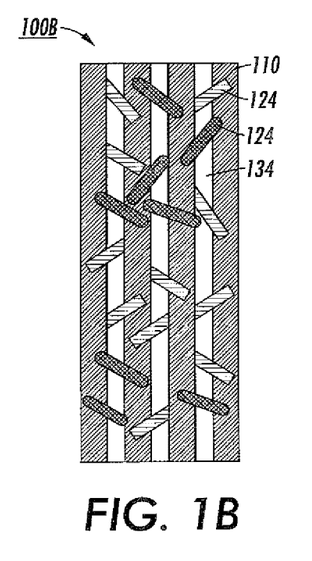
Figure 1C:
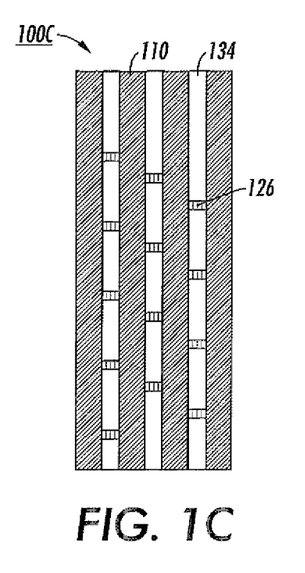

In order to create secondary electric conduction paths, various materials/methods can be employed to form the novel disclosed composite member. In one embodiment, a non-insulating binder polymer that is semi-conductive or conductive can be incorporated with the continuous filaments/fibers to form the composite member (as shown in FIG. 1A). In another embodiment, non-insulating fillers that are semiconductive or conductive can be introduced into an insulating binder polymer that contains one or more continuous filaments/fibers throughout the entire length (as shown in FIG. 1B). In an additional embodiment, nano-scale non-insulating fillers can be inserted or formed in-situ to interlink the one or more continuous filaments/fibers within an insulating binder polymer (as shown in FIG. 1C). As used herein the term non-insulating or "conductive" refers to an electric property of a material (e.g., a filler particle or a binder polymer) that is, for example, partially conductive, semi-conductive or conductive.

FIGS. 1A-C depict a portion of exemplary composite members in accordance with the present teachings. It should be readily apparent to one of ordinary skill in the art that the composite members 100A-C depicted in FIGS. 1A-1C represent generalized schematic illustrations and that other fibers/filaments/fillers/binder polymers can be added or existing fibers/filaments/fillers/binder polymers can be removed or modified.

As shown, FIG. 1A includes a first exemplary composite member 100A including continuous filaments 110 and a non-insulating binder polymer 132. The continuous filaments 110 can be distributed throughout the non-insulating binder polymer 132 along the elongated direction in a generally uniform distribution wherein the polymer surrounds and binds the fibers together to form a solid structure.

The continuous filament 110 can include one or more filaments or filaments arrays as disclosed herein. The non-insulating binder polymer 132 can be, for example, semiconductive or conductive and have a conductivity or resistivity that is suitably selected to fulfill the requirements of the intended application. The resistivity can be tuned to be equal to, or slightly greater than the resistivity of the continuous filaments 110 in order to have the continuous filaments 110 as the main current conduit for the disclosed composite member 100A and further for any related sensors or probe devices.

The non-insulating binder polymer 132 can include, for example, single-phase, intrinsically conductive polymers, which are also referred to as organic polymer semiconductors and organic semiconductors. The non-insulating binder polymer 132 can include, for example, polypyrrole, polyaniline, or their derivatives. In various embodiments, the non-insulating binder polymer 132 can include metal dopants in the exemplary polypyrrole and/or polyaniline to form a matrix that has an effective resistivity slightly greater than that of the continuous filaments 110.

In FIG. 1B, the exemplary composite member 100B can include continuous filaments 110, non-insulating fillers 124, and an insulating binder polymer 134. The continuous filaments 110 can be distributed throughout the insulating binder polymer 134 along the elongated direction. The non-insulating fillers 124 can be distributed throughout the insulating binder polymer 134 to interlink the continuous filaments 110 at various locations.

The non-insulating fillers 124 (also referred to herein as conductive fillers 124) can be at least semi-conductive and can include particles that have sizes substantially smaller than the sizes of the continuous filaments 110. The conductive fillers 124 can be used to at least partially fill the void volumes that naturally exist between, e.g., tightly-packed filaments 110 within the binder polymer 134. The conductive fillers 124 can be nanoscopic controlled conductive particles that are packed in the inter-fiber space within the binder polymer 134. Suitable nanoscopic particles can include, but are not limited to, nanotubes, nanorods, nanowires, nanofibers, and the like, and further include, but are not limited to carbon nanotubes, boron-doped carbon nanotubes, boron-nitride nanotubes, exfoliated graphine platelets, non-graphite platelets, doped silicon nanowires, carbon nanofibers, gold nanowires, copper or other metal/metal oxide-containing nanowires, non-carbon nano-fibers, or combinations thereof.

The exemplary conductive fillers 124 can have a small loading, e.g., about 10% or less, in some cases, even about 2% or less, by weight based on the total weight of the composite member 100B. The appropriate concentration can be used to build sufficient number and distribution of interconnections along the lengths of the parallelly running resistive filaments 110 in order to provide a matched or slightly exceeded resistivity with the continuous filaments/fibers 110. The conductive fillers 124 can have a relatively large aspect ratio in order to provide a large number of resistance controlling electrical interconnects along the lengths of the continuous filaments/fibers 110. In various embodiments, the conductive fillers 124 can have an aspect ratio of about 1.0 to about 10 or higher.

The insulating binder polymer 134 can include, for example, a thermosetting or thermoplastic resin. For example, many resins including polyester, polyurethane, vinyl ester, polypropylene, polyethersulpone, polyetheretherketone, polyimide, polyetherimide, or epoxy, can be used. The insulating binder polymer 134 can solidify the continuous filaments/fibers 110 and the conductive fillers 124 into a solid mass. In an exemplary embodiment, the conductive fillers 124 can serve as a filler phase in the binder phase. Suitable examples of such pre-composite polymers containing conductive fillers in a binder polymer can include those sold by Acheson Colloid. Co. under the trademark of Electrodag and having product numbers of, for example, PR-401A, PR-402A, PR-403A, and PR-404A.

In various embodiments, dispersions, mixtures, and/or emulsions that contain a soluble or liquid-phase thermo plastic or thermo-selling polymer (e.g., 134 in FIG. 1B) plus at least one fine, particle size, conductive filler (e.g., 124 in FIG. 1B) can be used for the exemplary pultrusion process to form the disclosed composite member 100B.

In an exemplary embodiment, the conductive fillers 124 can be formed by attriting or grinding one or more continuous filaments (as used for the continuous filament 110), for example, resistive carbon fibers, into particles with suitable sizes. The conductive fillers 124 can have sizes significantly smaller than the parent filaments/fibers 110. For example, the conductive fillers can be smaller than the parent filaments/fibers in at least one dimension having a range of about 10 to about 1,000 times smaller. In this case, the conductive fillers 124 can have the resistance characteristics of the parent fibers 110. In an exemplary pultrusion process, the resulting conductive fillers 124 and the parent continuous filaments can be compatibly blended with the insulating binder polymer 134 to form a composite member having desired electric properties. In practice, since sources and inventories of the exemplary resistive carbon fibers exist, this exemplary embodiment can be easily implemented.

In FIG. 1C, exemplary composite member 100C can include continuous filaments 110, in-situ conductive fillers 126, and an insulating binder polymer 134. The one or more continuous filaments 110 can be distributed throughout the insulating binder polymer 134 along the elongated direction to provide the primary electric conduction paths. The conductive fillers 124 can be distributed throughout the insulating binder polymer 134 to interlink the continuous filaments 110 to provide the secondary electric conduction paths.

The in-situ conductive fillers 126 can include any conductive fillers (e.g., the fillers 124 described in FIG. 1B) that can be inserted or formed in-situ to interlink the continuous filaments/fibers 110 at various specific locations. For example, the in-situ conductive fillers 126 can be, for example, nanoscopic intra-macroscopic-fiber linkages, which can be patterned and grown in situ by use of, for example, the emerging imaging of catalytic metal (e.g., gold) atoms attached on the filaments/fibers' surfaces and the known chemical vapor growing methods. The chemical vapor growing methods can be performed before or after the composite formation process (e.g., pultrusion). The in-situ conductive fillers 126 can include, for example, carbon nanotubes, doped-silicon nanowires, and nanoscale graphene plates, non-graphite platelets, nanorods, carbon nanofibers, non-carbon nanofibers, or other nanoconducting structures formed in-situ to interlink the continuous filaments 110 within the binder polymer matrix 124. These inter-fiber linkages can thus be grown in specific, precisely-controlled places and numbers along the fibers to create and control the number and location of the nanoscopic interconnections between the continuous filaments/fibers 110. Alternately, the interconnections can be physically inserted into specific locations along the length of the member by any suitable method that includes, for example, injecting microscopic quantities of a suitable nanofiber filled resin at various points along the length of the composite member, during its formation process and prior to final solidification of the member into the final solid form.

The disclosed composite members (e.g., the composite members 100A-C as shown in FIGS. 1A-1C) can therefore have the primary electric conduction paths by using resistive continuous filaments/fibers or their arrays and the second electric conduction paths by using a non-insulating binder polymer and/or various conductive fillers that serve as inter-fiber linkages within a binder matrix. The disclosed composite members can provide many advantages when used for sensors or instrument test probes.

Figure 2A:
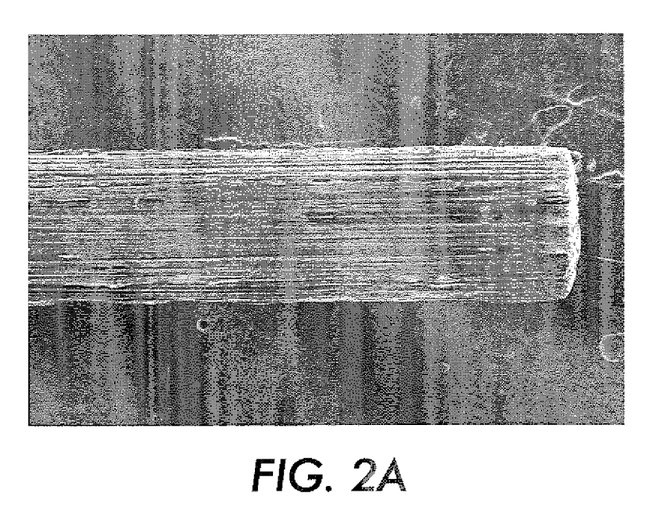
FIG. 2A depicts an exemplary SEM image at elevated magnification for a side view of an exemplary generation-1 composite member in accordance with the present teachings.
Figure 2B:
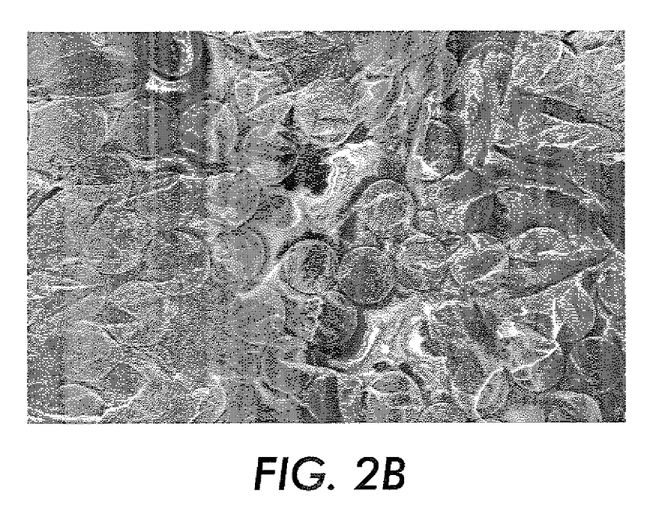
FIG. 2B depicts an exemplary SEM image at elevated magnification for an end view of an exemplary generation-1 composite member in accordance with the present teachings.

For example, the disclosed composite members can be compared with their earlier generation (also referred to herein as generation-1 composite member). The generation-1 composite member typically include only an insulating binder polymer (e.g., 134 in FIGS. 1B-1C) to electrically isolate resistive filaments/fibers (e.g., 110 in FIGS. 1A-1C) from establishing electrical contact with neighboring fibers and to bind the fibers into a solidified mass. Other than the resistive fibers, the generation-1 composite member has no additional conductive fillers (e.g., 124 in FIGS. 1B-1C) or conductive binder polymers (e.g., 132 in FIG. 1aA). FIG. 2A depicts an exemplary SEM photomicrograph at elevated magnification for a side view of an exemplary generations composite member in accordance with the present teachings. The exemplary generation-1 composite member is a resistive carbon fiber filled composite member. FIG. 2B depicts an exemplary SEM photomicrograph at elevated magnification for an end view of an exemplary generation-1 composite member in accordance with the present teachings. As shown, FIG. 2B illustrates a relationship between the resistive fiber phase (shown as circular shaped elements) embedded in and surrounded by an insulating epoxy binder resin. In contrast, FIG. 2A is an exemplary SEM of a lengthwise view of the composite member that illustrates the continuous length of the fibers which populate the solid composite member. For comparison purpose between the generation 1 composite member and the modified composite member, for example, as illustrated in FIG. 1B, cross-fiber and controlled resistive bridges between the continuous filaments 110 can be included in the modified composite member 100B, when small-sized resistive filler particles, e.g., the conductive filler 124, are employed into the binder polymer matrix 134.

In various embodiments, the disclosed modified composite members (e.g., 100A-C in FIGS. 1A-1C) can be used to prepare high-performance instrument probe devices and sensors. The probe assembly process, for example, can include, preparing continuous filaments/fibers, shape-forming the composite member that includes the prepared continuous filaments, a binder polymer and/or conductive fillers; and making probe contact for the sensor or probe tip from the shaped composite member.

For assembling functional devices, a large number of continuous filaments, fibers or fiber tows can first be prepared to provide a required resistivity. For example, a large number of resistive carbon fibers can be prepared by a controlled carbonization of the fibers by processes that are know to those skilled in the art. The resistive carbon fibers can include, for example, about 100 to about 10, 000 fibers, where each fiber has a resistance in the range of about 0.01 to about 1,000 megaohms/cm.

The prepared continuous filaments, fibers or fiber tows can then be combined with a suitable binder polymer, insulating or conductive according to various embodiments, by a composite shaping technology. For example, pultrusion process can be used as the mainline process to make long continuous lengths (e.g., about 500 feet or longer) of round composite member. In certain embodiments, epoxy resins, for example, having a product number of Epon 862, Epon 868, or Epon 863 manufactured by Hexion Specialty Chemicals, Inc, Houston Tex., that are reacted with suitable crosslinking agents can be used as binder polymers to form a rod-shaped solid plastic, in which the fibers run continuously along the length-wise axis of the composite rod. Alternately, other shaping technologies including, but not limited to, injection molding, compression, or transfer molding can be used, for example, to form short lengths with desired shapes.

Figure 3:
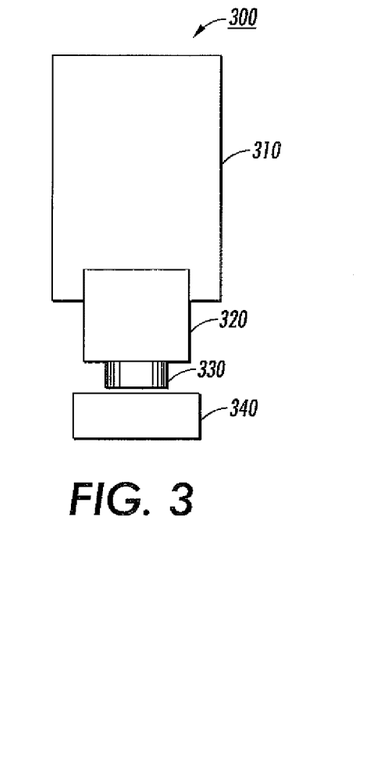
FIG. 3 is a schematic showing an exemplary instrument probe assembly in accordance with the present teachings.

The long composite member can then be processed and customized into desired contacts, sensors, or instrument probes. FIG. 3 is a schematic showing an exemplary assembly 300 of an exemplary instrument probe in accordance with the present teachings. The probe assembly 300 can include, for example, a contact tip 330, a plunger or spring element 320, a holder or mounting element 310 and a test subject 340. The contact tip 330 or probe tip can be connected with the plunger element 320 that is further connected with the mounting element 310. The test subject 340 can be placed underneath the contact tip 330.

The contact tip 330 can be a miniature-size probe tip, for example, a short composite rod as shown in FIG. 3 that is cut from the long composite member as disclosed above by, e.g., a waterjet process. The probe tip 330 can have a length of, e.g., about 0.070 inches to about 0.100 inches and a diameter of, e.g., about 0.010 inches to about 0.025 inches. The probe tip 330, e.g., the short composite rod, can have rod ends with well-controlled size, shape, topography, morphology, and composition. Such rod ends can be used as contact faces for, for example, a probe tip 330 to provide for reliable, high contact-area probe and sensor contacts.

Contacts having suitable electromechanical properties can then be made by joining, for example, an appropriate metal interconnecting plunger element 320 with the contact faces (i.e., rod ends) of the miniature probe tip 330 via, for example, metal-to-plastic crimp and/or conductive adhesives that are known to one of ordinary skill in the art. The contact, and specifically, the plunger element 320 connected with the tip end, can then be assembled into the holder element 310 by conventional assembly methods.

In an exemplary embodiment, the plunger element 320 can be configured with a suitable spring element (not shown in FIG. 3 but may be contained within body 310) that applies a desired contact pressure between the probe tip 330 and the test subject 340. The test subject 340 can include, but are not limited to, ICs, semiconductors, packages, interconnects, circuit pathways, and related circuit members. Electric contact to the test subject 340, for example, to the legs of an IC package, can be made to the "tip-end" of the probe 330 or, alternatively, at any point along the periphery of the probe 330, where resistive fibers have controlled electric resistances that span continuously from one contact face to the other contact face along the entire periphery of the rod probe 330.

Figure 4:
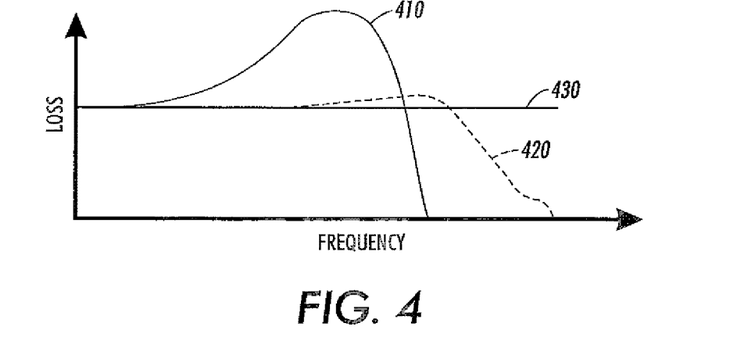
FIG. 4 depicts exemplary results for a probe formed from a composite member in accordance with the present teachings.

The disclosed probe assembly 300 can be used in the electronics industry to characterize dynamic behavior of components (e.g., at high frequencies and complex mixed-frequencies). For comparison purpose, FIG. 4 depicts exemplary results for a probe formed from a composite member in accordance with the present teachings. In this example, a piece of composite rod (i.e., including resistive fibers and a binder polymer) are cut into a desired length and installed in a test fixture using silver print as adhesive. The sample rod (probe) is cut to about 0.60 inches long, and the gap between metalized ends is about 0.50 inches. The DC resistance measured from end to end is about 575 ohms. During testing, a sine wave generator with about 50 O output is used to measure the loss response along with the equivalent series impedance through this fixture over frequency. Specifically, FIG. 4 includes a loss curve 410 as function of frequency for a traditional metal probe. As shown, the frequency-dependent loss starts at a magnitude, increases at intermediate frequencies, and decreases at higher radio-frequencies (RF). In comparison, the behavior of an ideal probe element shown as curve 430 in FIG. 4 has no variation in loss as a function of frequency over a broad spectrum of frequencies. The behavior of the disclosed probe contact is shown as curve 420 in FIG. 4, which is clearly an improvement over the loss behavior of a traditional metal contact and approaches the behavior of a theoretical ideal contact material.

It is noted that a certain level of magnitude loss can be a desired feature for certain electric test probes. The magnitude of the loss can serve a desired function by distributing a specified resistive characteristic immediately at the points of contact between the probe element and the test subject (i.e., DUT). A predictable loss can thus be preferred, particularly when it is constant or linear over the DC to RF frequency domains and constant across the area of the contact element. Importantly, this loss characteristic can buffer the operating circuit and the DUT from unwanted current surges, steady state parasitic current draws, and most other unwanted noises. As a result, the instrument probes having the generation-1 composite members and the modified composite members (e.g., 100 A-C in FIGS. 1A-1C) can provide such beneficial characteristic.

Referring back to FIG. 4, however, a variation of nearly 3 db magnitude can be found in the output signal (i.e., loss signal of the curve 420) as a non-linear function of frequency. In addition, other data (not shown) indicate a similar albeit minor instability at the DC to low frequency transition. Therefore, even though the discovered composite member can provide an improvement over traditional metal probes and can approach ideal loss behavior.

Conventional probing methods and materials used within the electronics industry to characterize the dynamic behavior of the test components are known to interfere to a great degree with the device under test (DUT) during measurement of its in-operation behavior. Over the decades, the industry has adapted many marginally acceptable counter-measurements in attempts to solve this problem. For example, one conventional solution relies upon complex, high impedance probe elements that attempt to minimize the current extracted from the DUT during the test event. Other counter-measurements attempt to electronically filter or otherwise compensate for the induced distortion caused by probing the active device. On the other hand, as interest and demand grow in new probing/sensing methodologies, interference-free contact probing signals are required to span the entire frequency spectrum.

A particular concern of the generation-1 and the inventive composite members can include non-linear frequency responses, which are attributed to low (and perhaps very low) level capacitive or inductive effects within the exemplary carbon fiber rod probe element. The non-linear responses can in turn cause non-uniform current flows through the array of the exemplary carbon fibers and the interspacing in the insulating binder resin. The non-linear distribution of currents flowing through nearby fibers can create variations in small but significant electric fields as well as the related magnetic fields between nearby neighboring fibers, which serve to add inductance to the electrical circuit that the probe tip transmits to the test circuit. Additionally, a second contributor to the non-linear spectral responses is due to the permittivity of the generation-1 composite, which is based upon an alignment of resistive fibers separated along their lengths by an insulating polymer. The permittivity can encouraging short time domain, charge-retention through a slight but significant capacitive effect within the probe tip. Many, if not all, of the subject problems maybe overcome with the inventive composite having controlled conduction pathways to effect changes to the adverse capacitive or inductive effects.

Figure 5:
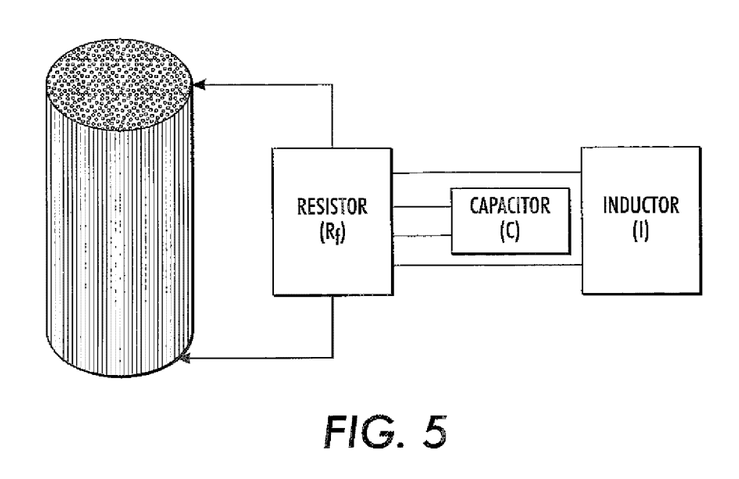
FIG. 5 is a simplified block diagram for circuit model of probe elements that have generation-1 design and composition in accordance with the present teachings.

FIG. 5 is a simplified block diagram for a circuit model of the probe elements that are believed to exist in a device having a composite plastic composition. As shown in FIG. 5, small capacitances and/or inductances can be in parallel to the large resistive element of the composite. This is because the electrical insulating characteristic of the binder polymer between fibers and/or fiber bundles can inherently limit the frequency response of this class of composite materials due to finite differences in resistance of adjacent fibers and adjacent current carrying fibers. Such difference can become more significant as frequency increases.

For the above reasons, the generation-1 composite member can be modified to form, for example, the composite members 100A-C as shown in FIGS. 1A-1C. The modification can be performed by, for example, tailoring the bulk conductivity through the use of a conductive binder polymer; incorporating a nanoscopic particulate conductive filler material to modify the resistivity; or in-situ growing (e.g., chemical vapor deposition, CVD) nano-fibrils that can interconnect the main current carrying fibers. The disclosed composite members (e.g., 100A-C) can therefore overcome the magnitude losses by creating and employing secondary electric pathways between fibers and along the elongated direction of the fibers at one or more locations to reduce or eliminate capacitive and/or inductive domains that contribute to the observed signal distortions.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composite member comprising:
an insulating binder polymer;
a plurality of continuous filaments disposed within the insulating binder polymer to provide a primary electric conduction path, wherein the continuous filaments are separated along their lengths by the insulating binder polymer and the insulating binder polymer prevents electrical contact between separate continuous filaments within the insulating binder;
a catalytic metal attached along surfaces of continuous filaments of the plurality of continuous filaments;
one or more conductive fillers distributed within the insulating binder polymer to interlink the plurality of continuous filaments to create a secondary electric conduction path in the composite member;
wherein the one or more conductive fillers comprise:
(a) in situ patterned and grown inter-fiber linkages disposed where the catalytic metal is attached along surfaces of filaments of the plurality of continuous filaments,
(b) doped-silicon nanowires and more than one of carbon nanotubes, nanoscale graphene plates, and carbon nanofibers,
wherein the one or more conductive fillers are about $10^1$ to about $10^6$ times shorter than the plurality of continuous filaments in at least one dimension,
wherein the one or more conductive fillers have a total concentration of about 2% or less by weight based on a total weight of the composite member and have an aspect ratio of about 1.0 or higher; and
wherein the plurality of continuous filaments has an equal or lower resistivity of the secondary electric conduction path,
wherein each continuous filament has a resistance ranging from about 0.01 to about 1000 megaohms/cm, and
wherein the composite member comprises one or more forms chosen from shafts, pillars, pipes, tubes, and hollow bodies.

2. The member of claim 1, wherein the insulating binder polymer comprises at least one of a thermosetting resin and a thermoplastic resin.

3. The member of claim 1, wherein the plurality of continuous filaments comprises one or more of fibers, wires, needles, threads, yarns, fabrics or combinations thereof.

4. The member of claim 1, wherein the one or more conductive fillers further comprises non-graphite platelets, nanorods, non-carbon nanofibers, or combinations thereof.

5. The member of claim 1, wherein each of the plurality of continuous filaments comprises at least one of silicon, carbon, boron, doped silicon, boron-carbon, boron-nitride, metal oxides, doped metal oxides, carbonized synthetic fibers, carbonized polyphenylene oxide (PPO), polyacrylonitrile (PAN) carbon fibers, pitch carbon fibers, partially carbonized PAN fibers, and graphite.

6. The member of claim 1, further comprising:
nanoscopic controlled conductive particles packed in the inter-fiber space within the insulating binder polymer, the nanoscopic particles comprising at least one of boron-doped carbon nanotubes, boron-nitride nanotubes, exfoliated graphine platelets, non-graphite platelets, gold nanowires, copper nanowires, metal/metal oxide-containing nanowires, and non-carbon nanofibers.

7. The member of claim 1, further comprising:
nanoscopic controlled conductive particles packed in the inter-fiber space within the insulating binder polymer, the nanoscopic particles comprising exfoliated graphine platelets and at least one of boron-doped carbon nanotubes, boron-nitride nanotubes, exfoliated graphine platelets, non-graphite platelets, gold nanowires, copper nanowires, metal/metal oxide-containing nanowires, and non-carbon nanofibers.

8. The member of claim 1, wherein each of the continuous filaments comprise a metal layer coating.

9. The member of claim 1, wherein the catalytic metal is attached on one filament of the plurality of continuous filaments, and wherein one or more conductive fillers is grown through the catalytic metal to interconnect the one filament with another filament that has a catalytic metal thereon.

10. The member of claim 1, wherein the member is in the form of a composite probe.

11. The member of claim 10, wherein the secondary electric conduction path reduces or eliminates capacitive domains and/or inductive domains that contribute to signal distortions when the composite probe is used to probe an active device.

12. The member of claim 1, wherein the member is in the form of a composite rod having a length of about 0.05 to about 0.5 inches.

13. An instrument probe comprising the composite member according to claim 1, wherein the instrument probe is configured to measure a dynamic behavior of an integrated circuit (IC), a semiconductor, a package, an interconnect, a circuit pathway, or a related circuit.

14. The instrument probe of claim 13, wherein the composite member is a composite rod having a diameter ranging from about 0.0004 inches to about 4 inches.

15. A composite member comprising:
an insulating binder polymer;
a plurality of continuous filaments disposed within the insulating binder polymer to provide a primary electric conduction path, wherein the continuous filaments are separated along their lengths by the insulating binder polymer and the insulating binder polymer prevents electrical contact between separate continuous filaments within the insulating binder; and
one or more conductive fillers distributed within the insulating binder polymer to interlink the plurality of continuous filaments to create a secondary electric conduction path in the composite member; wherein the one or more conductive fillers comprise:
(a) in-situ patterned and grown inter-fiber linkages along surfaces of filaments of the plurality of continuous filaments,
(b) doped-silicon nanowires and at least one of carbon nanotubes, nanoscale graphene plates, and carbon nanofibers,
wherein the one or more conductive fillers are about $10^1$ to about $10^6$ times shorter than the plurality of continuous filaments in at least one dimension, have a total concentration of about 2% or less by weight based on a total weight of the composite member, and have an aspect ratio of about 1.0 or higher,
wherein the plurality of continuous filaments has an equal or lower resistivity of the secondary electric conduction path,
wherein each continuous filament has a resistance ranging from about 0.01 to about 1000 megaohms/cm, and
wherein the composite member comprises one or more forms chosen from shafts, pillars, pipes, tubes, and hollow bodies.

16. The member of claim 15, further comprising a catalytic metal attached on one filament of the plurality of continuous filaments, and wherein one or more conductive fillers is grown through the catalytic metal to interconnect the one filament with another filament that has a catalytic metal thereon.

17. A composite member comprising:
an insulating binder polymer;
a plurality of continuous filaments disposed within the insulating binder polymer to provide a primary electric conduction path, wherein the continuous filaments are separated along their lengths by the insulating binder polymer and the insulating binder polymer prevents electrical contact between separate continuous filaments within the insulating binder;
one or more conductive fillers distributed within the binder polymer to interlink the plurality of continuous filaments to create a secondary electric conduction path in the composite member;
wherein the one or more conductive fillers are inserted along predetermined locations at surfaces of filaments of the plurality of continuous filaments,
wherein the one or more conductive fillers comprise doped-silicon nanowires and at least one of carbon nanotubes, nanoscale graphene plates, and carbon nanofibers,
wherein the one or more conductive fillers are about $10^1$ to about $10^6$ times shorter than the plurality of continuous filaments in at least one dimension, have a total concentration of about 2% or less by weight based on a total weight of the composite member, and have an aspect ratio of about 1.0 or higher,
wherein the plurality of continuous filaments has an equal or lower resistivity of the secondary electric conduction path, wherein each continuous filament has a resistance ranging from about 0.01 to about 1000 megaohms/cm, and
wherein the composite member comprises one or more forms chosen from shafts, pillars, pipes, tubes, and hollow bodies.

18. The member of claim 17, further comprising a catalytic metal attached at predetermined locations on filaments of the plurality of continuous filaments, and wherein one or more conductive fillers is grown through the catalytic metal to interconnect a one filament of the plurality of continuous filaments with another filament of the plurality of continuous filaments that has a catalytic metal thereon.

* * * * *